United States Patent
Wendt et al.

(10) Patent No.: US 10,507,880 B2
(45) Date of Patent: Dec. 17, 2019

(54) AIR-GUIDING DEVICE FOR A MOTORCYCLE

(71) Applicant: Bayerische Motoren Werke Aktiengesellschaft, Munich (DE)

(72) Inventors: Dieter Wendt, Dachau (DE); Patrick Faulhaber, Lenggries (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 140 days.

(21) Appl. No.: 15/834,117

(22) Filed: Dec. 7, 2017

(65) Prior Publication Data

US 2018/0099715 A1    Apr. 12, 2018

Related U.S. Application Data

(63) Continuation of application No. PCT/EP2016/058827, filed on Apr. 21, 2016.

(30) Foreign Application Priority Data

Jul. 15, 2015  (DE) .................. 10 2015 213 208

(51) Int. Cl.
*B62J 17/02*  (2006.01)
*B62K 21/02*  (2006.01)

(52) U.S. Cl.
CPC .............. *B62J 17/02* (2013.01); *B62K 21/02* (2013.01)

(58) Field of Classification Search
CPC .................................. B62J 17/02; B62K 21/02
(Continued)

(56) References Cited

U.S. PATENT DOCUMENTS

| 4,678,223 A | * | 7/1987 | Kishi | ...................... B60K 11/08 |
| | | | | 180/219 |
| 4,799,568 A | * | 1/1989 | Tanaka | ...................... B62J 17/02 |
| | | | | 180/219 |

(Continued)

FOREIGN PATENT DOCUMENTS

| CN | 1756693 A | 4/2006 |
| CN | 102407886 A | 4/2012 |

(Continued)

OTHER PUBLICATIONS

English translation of Chinese Office Action issued in counterpart Chinese Application No. 201680024302.X dated Feb. 2, 2019 (10 pages).

(Continued)

*Primary Examiner* — Jason S Morrow
*Assistant Examiner* — E Turner Hicks
(74) *Attorney, Agent, or Firm* — Crowell & Moring LLP

(57) ABSTRACT

An air-guiding device for a motorcycle is provided to provide defined guidance of wind airflow in a region of a motorcycle fork. The air-guiding device include at least one rear guiding element in the longitudinal direction configured to be rigidly fastened to the motorcycle behind the motorcycle fork, and a front guiding element configured to be fastened indirectly or directly to the rear guiding element in front of the motorcycle fork in a manner which allows the front guiding element to rotate relative to the rear guiding element when the motorcycle fork is rotated about a vertical axis. The air guiding device may also be provided with a central guiding element behind the motorcycle for which is connected to the front guiding element and rotatable relative to the rear guiding element.

16 Claims, 2 Drawing Sheets

(58) Field of Classification Search
USPC .................................. 296/193.1, 208, 78.1
See application file for complete search history.

(56) References Cited

U.S. PATENT DOCUMENTS

| | | | |
|---|---|---|---|
| 5,853,216 A * | 12/1998 | Barg | B62J 17/00 |
| | | | 296/78.1 |
| 6,619,415 B1 | 9/2003 | Hasumi et al. | |
| 7,284,632 B2 * | 10/2007 | Ito | B62J 17/00 |
| | | | 180/229 |
| 8,936,123 B2 * | 1/2015 | Kogo | B60Q 1/0433 |
| | | | 180/219 |
| 2012/0068498 A1 | 3/2012 | Wolf | |
| 2013/0081896 A1 | 4/2013 | Nakamura | |
| 2013/0249251 A1 | 9/2013 | Nakamura et al. | |

FOREIGN PATENT DOCUMENTS

| | | |
|---|---|---|
| CN | 103029777 A | 4/2013 |
| DE | 600 12 440 T2 | 12/2004 |
| JP | 57-44531 A | 3/1982 |
| JP | 59-227522 A | 12/1984 |
| JP | 60-84323 U | 6/1985 |
| JP | 3-67797 A | 3/1991 |
| JP | 3-284495 A | 12/1991 |
| JP | 5-686 A | 1/1993 |
| JP | 11-278344 A | 10/1999 |
| JP | 2004-338467 A | 12/2004 |
| JP | 2005-254873 A | 9/2005 |
| JP | 2013-180644 A | 9/2013 |
| JP | 2013-193639 A | 9/2013 |

OTHER PUBLICATIONS

Japanese-language Office Action issued in counterpart Japanese Application No. 2018-500885 dated Oct. 24, 2018 with partial English translation (14 pages).
International Search Report (PCT/ISA/210) issued in PCT Application No. PCT/EP2016/058827 dated Aug. 11, 2016 with English translation (eight pages).
German-language Written Opinion (PCT/ISA/237) issued in PCT Application No. PCT/EP2016/058827 dated Aug. 11, 2016 (eight pages).
German-language Search Report issued in counterpart German Application No. 10 2015 213 208.0 dated Jun. 7, 2016 with partial English translation (12 pages).

* cited by examiner

AIR-GUIDING DEVICE FOR A MOTORCYCLE

CROSS REFERENCE TO RELATED APPLICATIONS

This application is a continuation of PCT International Application No. PCT/EP2016/058827, filed Apr. 21, 2016, which claims priority under 35 U.S.C. § 119 from German Patent Application No. 10 2015 213 208.0, filed Jul. 15, 2015, the entire disclosures of which are herein expressly incorporated by reference.

BACKGROUND AND SUMMARY OF THE INVENTION

The invention relates to an air-guiding device for a motorcycle which is formed for defined guidance of the airstream air flow in the region of a motorcycle fork.

It is desirable for sports motorcycles to make the air resistance values and lift values as low as possible. One region with potential for improvement over conventional solutions has been shown to be the fork aperture with the region between the front wheel and the frontal covering in which the motorcycle fork extends from the front wheel substantially in the vertical direction to the handlebar and for the most part carries out the air supply for the radiator. As a result of the significant air flow turbulence which can be felt in particular at high speeds in the region of the fork aperture, the Cw value and lift of the motorcycle are increased. The supply of air to the radiator is furthermore substantially carried out in an uninfluenced manner and thus with losses.

The object on which the invention is based is therefore to provide an air-guiding device with the help of which the region of the fork aperture of a motorcycle can be improved so that the air resistance and lift of the motorcycle can be reduced and the airstream can be supplied more effectively to the subsequent components in the direction of flow and to the radiator.

According to the invention, there is proposed an air-guiding device for a motorcycle which is formed for defined guidance of the airstream air flow in the region of a motorcycle fork, wherein the air-guiding device has at least one rear guiding element as seen in the longitudinal direction, which guiding element is formed to be fastened fixedly on the motorcycle on the rear side of the motorcycle fork, and a front guiding element as seen in the longitudinal direction, which guiding element is formed to be fastened indirectly or directly on the rear guiding element on the front side of the motorcycle fork, wherein the front guiding element is rotatable with respect to the rear guiding element about a vertical axis.

The longitudinal direction is defined as the direction of travel of the motorcycle, the transverse direction is defined as perpendicular to the longitudinal direction in the lateral direction and the vertical axis is defined as the axis parallel to the motorcycle fork axis. An angled positioning, which is possible in terms of driving dynamics, of the motorcycle fork with respect to the actual vertical axis is not considered here on the grounds of simplicity.

The air-guiding device is formed to bear at least with the front guiding element on the underside flat against the frontal covering and to minimize an intake of air in the vertical direction to the fork crown. Moreover, during travel, the air entering into the region of the fork aperture is guided in a predefined manner to the radiator. As a result of the relative movability of the front to the rear guiding element, air guidance is not only carried out when driving straight ahead, but also during a steering angle in which the motorcycle fork rotates about the vertical axis.

The rear guiding element can preferably be fastened directly on the radiator of the motorcycle and forms a direct connection of the air-guiding device to the radiator. It extends in the transverse direction over the entire width of the fork aperture so that the region is also flatly covered behind the motorcycle fork as seen in the longitudinal direction.

In one advantageous embodiment variant, it is provided that the front guiding element has a front portion for extension on the front side of the motorcycle fork and an adjoining central portion for extension between the motorcycle fork. The two regions thus flatly cover the portion of the fork aperture laterally and in front of the motorcycle fork. The extension of the front guiding element in the longitudinal direction is many times greater than that of the rear guiding element in order to ensure full-surface coverage of the fork aperture and in all driving situations, i.e. also in the case of a steering angle.

An embodiment is furthermore expedient in which the front guiding element has two recesses which are formed to at least partially receive or enclose the motorcycle fork in the circumferential direction. The motorcycle fork should be able to penetrate through the guiding element via the recesses. At the same time, however, the front guiding element can extend around the motorcycle fork in such a manner that the substantially round form in cross-section is reproduced and the front guiding element can enclose the motorcycle fork on the front side. Rounding of the recess is accordingly adapted to the outer diameter of the motorcycle fork in order to avoid air gaps between the recess and the motorcycle fork.

In one expedient embodiment, the rear guiding element also has two recesses which are formed to at least partially engage around the motorcycle fork from behind in the case of a steering angle. The recesses are provided in order to not block a steering movement of the motorcycle fork. In the case of a steering situation, the steered side of the motorcycle fork does not lie within the recess of the rear guiding element. The front guiding element moves in the steering direction with the motorcycle fork and forms, with the rear guiding element, a substantially closed ring around the locked side of the motorcycle fork.

An embodiment is furthermore advantageous in which the front portion of the front guiding element has a front edge with a round outer contour. The front edge or the front guiding element extends in the transverse direction so far to the outside that the motorcycle fork is laterally covered in projection. As a result of this, guidance of air is already realized in the longitudinal direction in front of the motorcycle fork along the fork aperture.

The central portion of the front guiding element is dimensioned in such a manner that it has an extension in the longitudinal direction in order to cover or enclose the motorcycle fork in the longitudinal direction. The fork aperture is thus flatly covered by the front guiding element both laterally and also at the front side.

In a further development of the above embodiment, it is provided that the air-guiding device additionally has a central guiding element as seen in the longitudinal direction which is arranged between the front and rear guiding element, is connected directly to the front guiding element and is rotatable with respect to the rear guiding element about the vertical axis. The use of the central guiding element increases the surface area of the fork aperture which can be covered by the air-guiding element.

In one variant, it is provided that the central guiding element comprises side elements which are arranged laterally on the central guiding element so that they engage around the motorcycle fork on the rear side and can cover the fork aperture in this region. Alternatively, side elements are fastened movably on the rear guiding element, but also extend behind the motorcycle fork for covering.

The construction is further developed to also represent the covering of the radiator side. In the case of a full steering angle, there is only a small distance between motorcycle fork and radiator. A fixed component, for example, on the rear guiding element, can only cover this small region. As a result, a gap is generated in the zero position of the steering and on one side in the case of a steering angle. In order to fully seal off this region and in the case of a steering angle create a clearance for the movement of the motorcycle fork, a movement mechanism is provided on the air-guiding device, by which movement mechanism the side elements are movable relative to the rear guiding element.

In a first embodiment, the movement mechanism is formed as a folding mechanism with side elements which fold away vertically with respect to the rear guiding element. The introduction of force for folding away of the side flap is carried out via the motorcycle fork. In one embodiment, a guide for the direction of movement of the side flap can furthermore be provided at the rear guiding element in order to ensure a defined movement.

In one alternative embodiment, the movement mechanism is formed as a displacement mechanism with side elements arranged displaceably with respect to the rear guiding element, wherein the displacement of the side elements is carried out in a plane which is parallel to a plane of extent of the rear guiding element. The introduction of force for displacement of the side flap is also carried out via the motorcycle fork. In the case of this embodiment, the side flaps can be pushed to the side and onto or below the rear guiding element.

In one further development, it is furthermore provided that the side elements are held on the central guiding element in each case via a spring which exerts in each case a permanent restoring force on the side elements into a starting position. In the case of a return of the motorcycle fork into a straight-ahead position, the side elements are returned to their starting position and thus bear permanently against the motorcycle fork and seal off the fork aperture.

The air-guiding device is furthermore characterized in that the front guiding element, the rear guiding element and/or the central guiding element and/or the side elements are arranged at least in portions lying flat on top of one another. It is preferred that all of the guiding elements lie flat on one another in order to form the disk-like overall body which extends around the motorcycle fork up to the radiator.

In one expedient embodiment variant, guide holes are furthermore provided on the rear guiding element, the shape of which guide holes corresponds to a trajectory of the motorcycle fork in the case of a steering angle, and into which complementary guide means formed on the front guiding element engage in order to move the front guiding element in the case of a steering angle about the vertical axis along the trajectory. The central guiding element can also be correspondingly guided via the guide holes. Molded-on pins, screws or other means known to the person skilled in the art from the prior art can be used as guide means.

In one advantageous embodiment, for connection of the air-guiding device to components of the motorcycle, it is provided that the front guiding element and the rear guiding element have a step in a connecting region to components of the motorcycle seen in a lateral cross-section, which step enables, at least in portions, an overlapping connection to the components of the motorcycle. At the front side, the underside of the frontal covering and, at the rear side, the radiator serve as components of the motorcycle. The air-guiding device terminates via the step-like connection flatly at the motorcycle components, supported in each case in the longitudinal direction and at least partially sealed off.

In order to avoid undesirable friction of the guiding elements on the motorcycle fork, the edges of the guiding elements can be rounded or enclosed with a soft additional material.

Plastic is preferably used as the material for the components of the air-guiding device.

Other objects, advantages and novel features of the present invention will become apparent from the following detailed description of one or more preferred embodiments when considered in conjunction with the accompanying drawings.

BRIEF DESCRIPTION OF THE DRAWINGS

Identical reference numbers designate identical parts in all views.

DETAILED DESCRIPTION OF THE DRAWINGS

Figure 1:
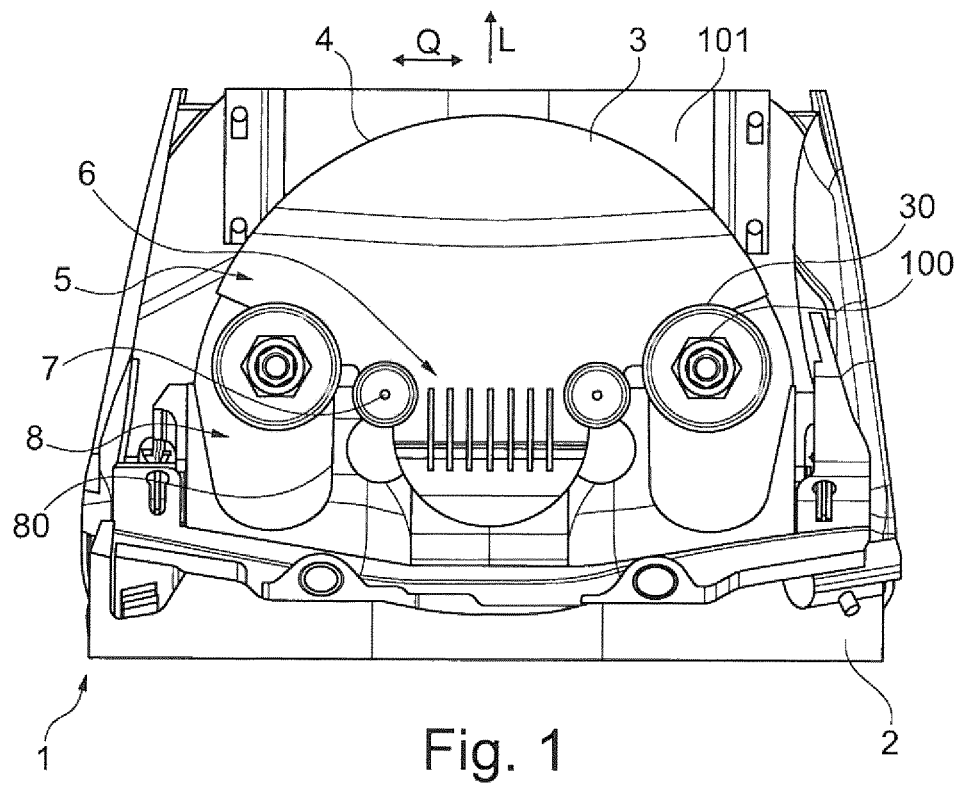
FIG. 1 shows a first embodiment of the air-guiding device of the present invention mounted on a motorcycle, in a view from below.

A first embodiment of air-guiding device 1 in a state mounted on a motorcycle in a view from below is represented in FIG. 1. Frontal covering 101 and motorcycle fork 100 of the motorcycle are shown for better understanding. Air-guiding device 1 comprises a rear guiding element 2 as seen in longitudinal direction L which is fastened fixedly on the radiator of the motorcycle on the rear side of motorcycle fork 100 and extends in one piece over the entire width so that the region of the radiator as seen in the vertical direction is covered. Rear guiding element 2 has two recesses 8 shaped in a rounded manner complementary to motorcycle fork 100, into which recesses 8 motorcycle fork 100 can be moved in the case of a steering angle and which engage behind motorcycle fork 100 at the rear side and laterally in the installed state. A connection is produced between front and rear guiding elements 3, 2 via webs 80 which extend in the longitudinal direction and are formed on rear guiding element 2. Front and rear guiding elements 3, 2 are fastened at fastening points 7 provided on webs 80 in a manner mounted rotatably to one another about the vertical axis. Front guiding element 3 has on both sides recesses 30 which are also shaped in a complementary manner to the rounding of motorcycle fork 100 and receive or enclose these in portions in the circumferential direction, At the front as seen in the longitudinal direction, front guiding element 3 extends with its front portion 5 at the front side of motorcycle fork 100, wherein front portion 5 has a front edge 4 directed in the direction of travel with a round outer contour. In lateral transverse direction Q, front guiding element 3 extends with its outer edge 4 beyond the projection of motorcycle fork 100 in order to cover it in a projection from the front. Central portion 6 adjoins front portion 5 and extends between motorcycle fork 100 up to rear guiding element 2. As a result, a substantially complete covering of the fork aperture takes place both when traveling straight ahead, as shown in FIG. 1, and in the steered state.

Figure 2:
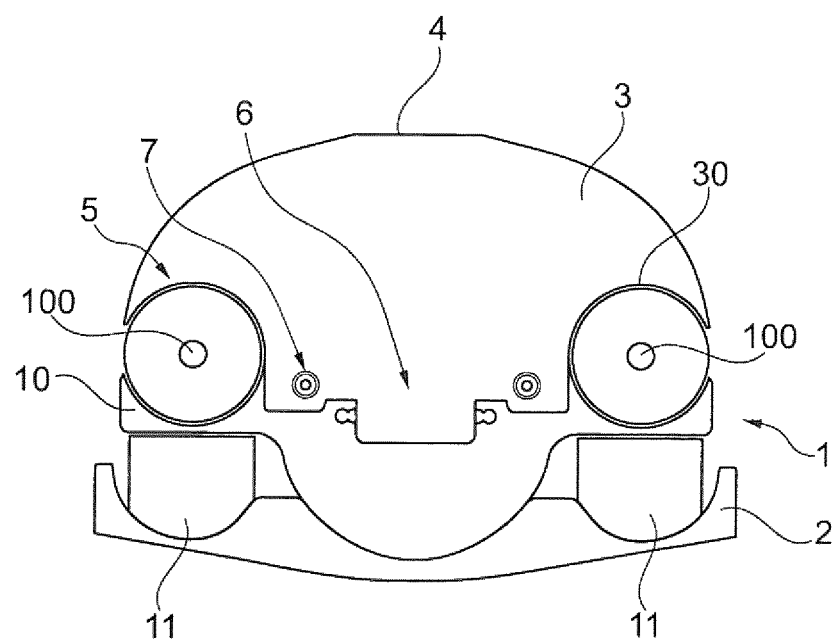
FIG. 2 shows a second embodiment of the air-guiding device of the present invention, in a view from above.

FIG. 2 shows a second embodiment of air-guiding device 1 in a view from above without a motorcycle. Front guiding element 3 corresponds substantially to that from FIG. 1, but front portion 5 extends in the transverse direction further to the outside and in the longitudinal direction further to the rear. In the embodiment according to FIG. 2, air-guiding device 1 additionally comprises a central guiding element 10 as seen in the longitudinal direction, which central guiding element 10 is arranged between front and rear guiding elements 2, 3 and is connected directly to front guiding element 3. Both front guiding element 3 and central guiding element 10 are rotatable with respect to rear guiding element 2 about the vertical axis and can be displaced by motorcycle fork 100 in the case of a steering angle. As a result of the use of central guiding element 10, rear guiding element 2 extends less far in the longitudinal direction, but rather forms the transition and connection to the radiator (not shown).

The free fork aperture region according to FIG. 1 in the case of the embodiment on the rear side of motorcycle fork 100 is closed in the embodiment according to FIG. 2 in that side elements 11 are arranged on central guiding element 10, which side elements 11 are arranged laterally on central guiding element 10 so that they can engage around the motorcycle fork on the rear side. The flaps of side elements 11 can fold away vertically with respect to rear guiding elements 2 via a movement mechanism formed as a folding mechanism if a steering angle is present. When steering back into the zero position, the flaps of side elements 11 are pulled back, for example, via torsion springs into the position shown in FIG. 2.

Figure 3:
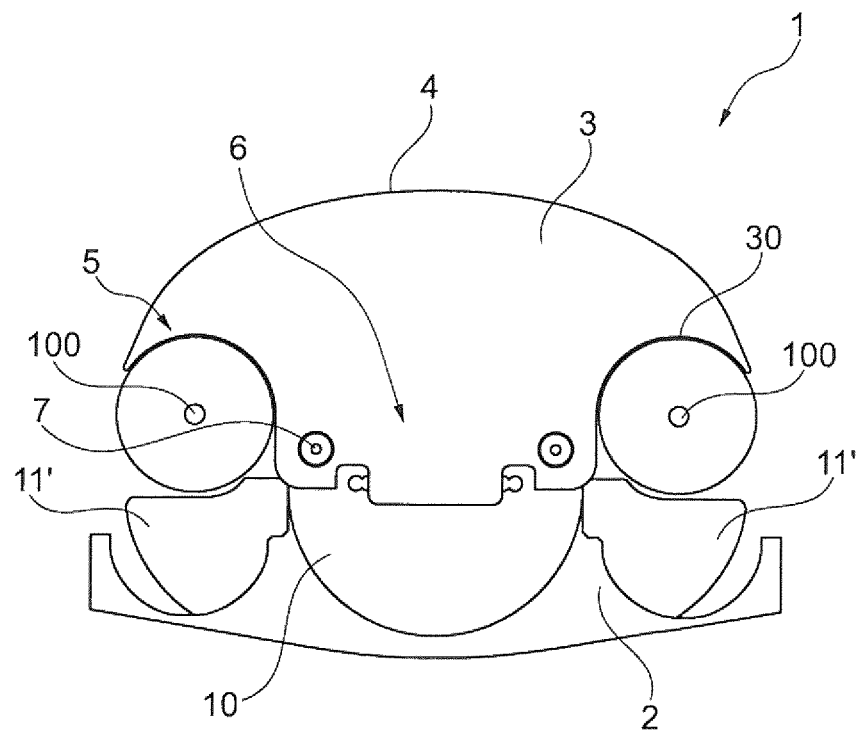
FIG. 3 shows a third embodiment of the air-guiding device of the present invention, in a view from above.
Figure 4:
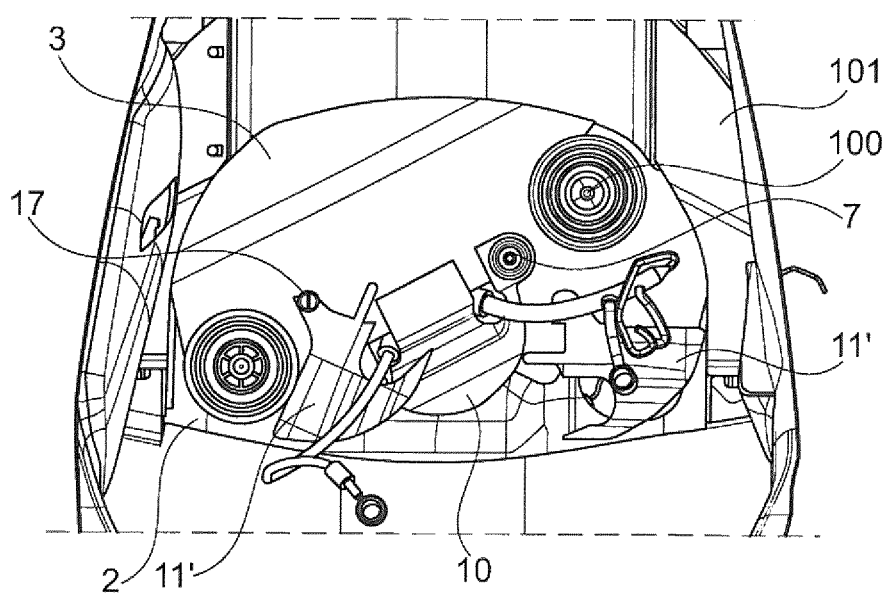
FIG. 4 shows a representation of the third embodiment according to FIG. 3 mounted on a motorcycle during a steering angle, in a view from below.

FIG. 3 shows a third embodiment of air-guiding device 1 in a view from above without the representation of the motorcycle. The features in terms of front and rear guiding element 3, 2 correspond substantially to those from FIG. 2. Central guiding element 10 is fastened on front guiding element 3 as in FIG. 2, but rear guiding element 2 has webs extending in the longitudinal direction on which separate side elements 11' are fastened at fastening points 17 (see FIG. 4) rotatably about the vertical axis. The movement mechanism for side elements 11' is formed as a displacement mechanism, wherein in the case of a steering angle represented from below in FIG. 4 respective side element 11' is pushed under rear guiding element 2 parallel to its plane of extent in the transverse direction. Respectively offset side elements 11' are also returned into the zero position, for example, via a torsion spring, not represented.

It applies to all the embodiments that front guiding element 3, rear guiding element 2, central guiding element 10 and side elements 11, 11' preferably lie flat on top of one another and form a disk-like body for closing off the fork aperture and for guiding air to the radiator.

The shape of side elements 11' is not restricted to the embodiment shown in which it substantially represents a quadrant. Variants are also possible in the case of which in particular the side facing motorcycle fork 100 is provided with a rounding which is formed to enclose motorcycle fork 100 at least in portions.

Moreover, in all the embodiment variants, apertures can be provided in the case of front guiding element 3, rear guiding element 2, central guiding element 10 or side elements 11, 11', through which, for example, brake lines or the like can be guided. Guiding elements 2, 3, 10 and side elements 11, 11 can furthermore have guides and guide means in order to be able to be moved in a guided manner relative to one another.

The invention is not restricted in its embodiment to the preferred embodiments indicated above. On the contrary, a number of variants are conceivable which make use of the represented solution even in the case of embodiments of fundamentally different types. For example, further guiding elements can be integrated in the air-guiding device in order to realize even greater flexibility for covering regions of the fork aperture in the case of a steering angle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An air-guiding device configured to guide an airstream air flow in a region of a fork of a motorcycle, comprising:
    a rear guiding element configured to be fixed to the motorcycle behind a rear side of the motorcycle fork in a longitudinal direction of the motorcycle; and
    a front guiding element configured to be located at a front side of the motorcycle fork and be fastened indirectly or directly to the rear guiding element,
    wherein
        the front guiding element is rotatable with respect to the rear guiding element about a vertical axis of the motorcycle fork, and
        a front edge of the rear guiding element is behind a front edge of the front guiding element in the longitudinal direction of the motorcycle.

2. The air-guiding device for a motorcycle as claimed in claim 1, wherein
    the front guiding element includes two recesses configured to at least partially enclose the motorcycle fork in the circumferential direction.

3. The air-guiding device for a motorcycle as claimed in claim 2, wherein
    the front guiding element includes a front portion extending forward in the longitudinal direction from the front side of the motorcycle fork,
    the front guiding element includes a central portion extending from the front portion rearward at least partially between fork tubes of the motorcycle fork.

4. The air-guiding device for a motorcycle as claimed in claim 3, wherein
    the front portion includes a front edge with a round outer contour, and
    the front edge extends in a transverse direction of the motorcycle a distance sufficient to cover the motorcycle fork.

5. The air-guiding device for a motorcycle as claimed in claim 3, wherein
    the central portion includes an extension in the longitudinal direction configured to cover the motorcycle fork in a transverse direction of the motorcycle.

6. The air-guiding device for a motorcycle as claimed in claim 1, further comprising:

a central guiding element between the front and rear guiding elements,
wherein the central guiding element is
    connected to the front guiding element, and
    rotatable with respect to the rear guiding element about the vertical axis.

7. The air-guiding device for a motorcycle as claimed in claim 6, wherein
    the central guiding element includes lateral side elements configured to cover rear sides of fork tubes of the motorcycle fork.

8. The air-guiding device for a motorcycle as claimed in claim 6, wherein
    the rear guiding element includes lateral side elements configured to cover rear sides of fork tubes of the motorcycle fork.

9. The air-guiding device for a motorcycle as claimed in claim 8, wherein
    the lateral side elements being movably connected to the rear guiding element in a manner which allows the lateral side elements to be displaced relative to the rear guiding element such that a clearance for the movement of the motorcycle fork is created when the motorcycle fork is turned to a steering angle.

10. The air-guiding device for a motorcycle as claimed in claim 9, wherein
    the lateral side elements are connected to the rear guiding element by a folding mechanism configured to allow the lateral side elements to fold vertically with respect to the rear guiding element when the motorcycle fork is turned to the steering angle.

11. The air-guiding device for a motorcycle as claimed in claim 9, wherein
    the lateral side elements are connected to the rear guiding element in a manner that allows the lateral side elements to be displaced with respect to the rear guiding element in a plane is parallel to a plane of extent of the rear guiding element.

12. The air-guiding device for a motorcycle as claimed in claim 7, wherein
    the front guiding element, the rear guiding element, the central guiding element and the lateral side elements are arranged at least in portions lying flat on top of one another.

13. The air-guiding device for a motorcycle as claimed in claim 8, wherein
    the front guiding element, the rear guiding element, the central guiding element and the lateral side elements are arranged at least in portions lying flat on top of one another.

14. The air-guiding device for a motorcycle as claimed in claim 12, wherein
    the lateral side elements are biased into a starting position by a spring.

15. The air-guiding device for a motorcycle as claimed in claim 2, wherein
    a shape of each of two rear guiding element recesses corresponds to a trajectory of the respective ones of the motorcycle fork tubes when the motorcycle fork is turned to a steering angle, and
    complementary guides of the front guiding element engage the two rear guiding element recesses such that the front guiding element is displaced about a vertical axis of the motorcycle fork when the motorcycle fork is turned to the steering angle.

16. The air-guiding device for a motorcycle as claimed in claim 1, wherein
    at least a portion of at least one of the front guiding element and the rear guiding element includes a step in a region adjacent to a covering of the motorcycle configured to overlap at least a portion of the covering.

\* \* \* \* \*